UNITED STATES PATENT OFFICE.

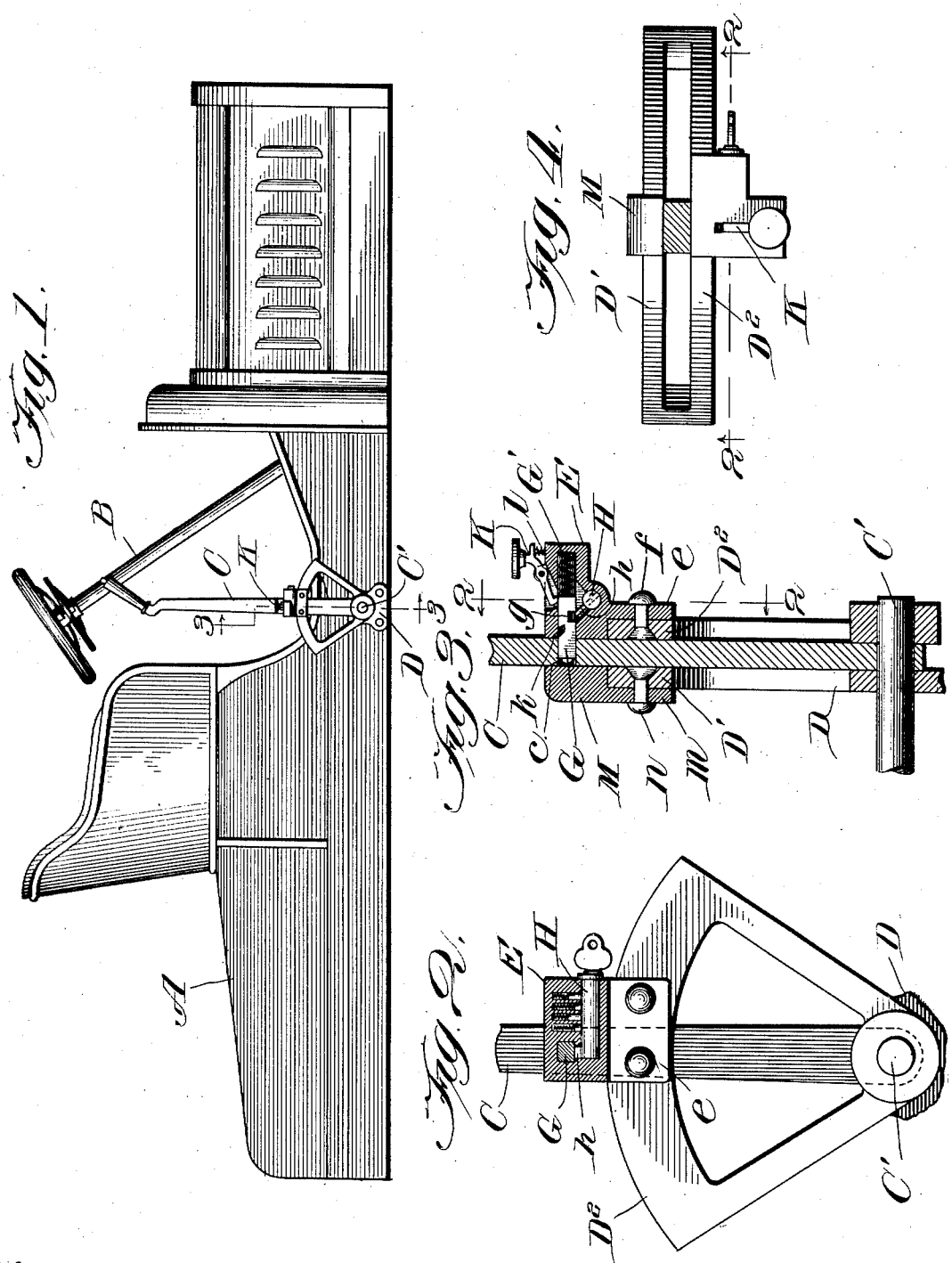

JOHN F. COLTMAN, OF CHICAGO, ILLINOIS.

AUTOMOBILE-LOCKING MECHANISM.

No. 868,907.        Specification of Letters Patent.        Patented Oct. 22, 1907.

Application filed September 22, 1906. Serial No. 335,709.

*To all whom it may concern:*

Be it known that I, JOHN F. COLTMAN, a citizen of the United States, residing at Chicago, county of Cook, State of Illinois, have invented a certain new and useful Improvement in Automobile-Locking Mechanism; and I declare the following to be a full, clear, and exact description of the same, such as will enable others skilled in the art to which it pertains to make and use the same, reference being had to the accompanying drawings, which form a part of this specification.

My invention relates in general to automobiles, and more particularly to mechanism to prevent the operation of the machine by an unauthorized person.

The owners of automobiles incur the danger of having their machines stolen when left unattended. To avoid this danger automobile owners sometimes chain the wheels of the machine together, or so chain a part of the operating mechanism as to prevent the movement thereof necessary to start the machine. This means of insuring safety is inconvenient and requires time to secure the chain and pad-lock therefor in position when the machine is left and to remove the chain before starting the machine. Another method of preventing the stealing of automobiles is to provide a switch having a removable plug contact in the sparking circuit, the plug being removed when the machine is left. This method is, however, far from secure as a conductor pin may be easily inserted in place of the plug and the circuit thereby closed.

The primary object of my invention is to provide an automobile in which a lever of the operating mechanism may be positively locked in such a position that the machine can not be started.

A further object of my invention is to provide means for locking a transmission lever of an automobile in its "off" position so that an unauthorized person can not operatively connect the engine with the driving axle of the automobile.

A still further object of my invention is to provide means for locking a lever in a given position which will be simple in construction, inexpensive in manufacture, and efficient in use.

The embodiment of my invention herein disclosed may be generally described as consisting of locking mechanism interposed between a transmission lever of an automobile and the guiding frame for said lever, the locking mechanism comprising a casing rigidly secured to the guiding frame at a point where the lever disconnects the engine from the automobile driving mechanism, a bolt adapted to project into the path of movement of the lever to engage a hole in the lever, and means for normally retaining the bolt retracted out of the path of the lever.

My invention will be more fully described hereinafter with reference to the accompanying drawing in which the same is illustrated as embodied in a convenient and practical form, and in which Figure 1 is a side elevational view; Fig. 2 an enlarged detail view on line 2—2 Fig. 3; Fig. 3 a sectional view on line 3—3 Fig. 1 on an enlarged scale; and Fig. 4 a plan view, the lever being shown in section.

The same reference characters are used to designate the same parts in the several figures of the drawings.

Reference character A indicates the body of an automobile while reference character B designates the steering shaft.

C indicates a lever for controlling the transmission mechanism to propel the vehicle at different speeds and to disconnect the engine from the driving mechanism of the machine.

D designates a frame secured to the body of the automobile and provided with parallel segmental guides D' and $D^2$ between which the lever C travels.

The parts above described may be of any usual type and construction.

My invention is not limited in its application to any particular style of automobile or to any special controlling mechanism therefor. The automobile and parts of the controlling mechanism shown in the drawing and above described are merely illustrated for convenience in disclosing the construction and operation of my invention.

The locking mechanism may be conveniently interposed between a transmission lever and its guiding frame and I have shown and described herein my invention as so embodied.

Reference character E designates the casing of a lock secured in any convenient manner to the portion $D^2$ of the segmental guide of the lever C. A flange $e$ may be conveniently formed on the casing of the lock through which pass fastening devices, such as rivets $f$, into engagement with the portion $D^2$ of the guide frame.

G designates the bolt of the lock which is preferably projected outwardly from the casing by a spring G'.

H indicates a key adapted to be inserted in the lock to retract the bolt against the tension of the spring. The portion $h$ of the key is adapted to project into a notch $g$ in the bolt when the key is inserted in the lock so that a rotation of the key will retract the bolt.

The details of the lock need not be further described as my invention does not reside in the particular construction and operation of the lock.

In order that the bolt of the lock may be held normally in its retracted position, a catch K is provided which engages a notch $k$ in the bolt and thereby prevents the spring G from projecting the bolt. The latch K may be of any desired construction, as shown for instance in Fig. 3, in which the latch is in the form of a lever pivoted upon the locking casing intermediate of its ends and normally oscillated by a spring $l$ so that it will automatically engage the notch in the bolt when the bolt is retracted. The lock is secured to the segmental guide at such a point that when the lever C is in its "off" position the bolt G may engage a hole $c$ in the lever, and thereby lock the same in such position.

In order that the bolt can not be forced out of the hole in the lever a protecting plate M is secured to the part D' of the segmental guide. Any suitable means may be provided for securing the protecting plate to the guide as for instance rivets $n$ extending through alined holes in the guide and in a flange $m$ on the plate which overlies the outer surface of the guide.

It will be seen that the inner faces of the lock casing and of the plate M are flush with the inner surfaces of the two guides so that when the lever is in its locked position it is in engagement with the lock casing and the plate on its opposite sides.

The operation of my invention is as follows. The bolt G is retracted by means of the key E and held in such position against the tension of the spring G' by the catch K. The lever C may then be removed between the two parts of the guide for controlling the machine. When it is desired to leave the machine unattended the lever C is moved to "off" position and the catch K is oscillated to disconnect the same from the bolt G. The spring G' then projects the bolt across the space between the two parts of the segmental guide. The bolt G consequently passes through a hole $c$ in the lever C as the locking mechanism is located at a point on the segmental guide corresponding to the position of the lever when in its "off" position.

The machine may be left with safety as it can not be started while the lever C is in the position in which it is retained by the lock.

When it is desired to again start the machine the key H is inserted in the lock and the bolt withdrawn from engagement with the hole in the lever. The catch K automatically retains the bolt in the retracted position to which it is removed by the key so that the key may be removed from the lock. The lever C may then be operated in the usual manner inasmuch as the bolt does not project into its path of movement between the two parts of the segmental guide.

From the foregoing description it will be observed that I have invented an improved mechanism for preventing the operation of automobiles by unauthorized persons so that the machines may be left unattended with perfect safety.

Having now fully described my invention, what I claim as new and desire to secure by Letters Patent is:

1. The combination, with a lever, a lever guide, a lock casing secured to the guide so as to have its face flush with the side of the guide, a spring actuated bolt mounted in said casing and arranged to move transversely of the plane of movement of the lever, said lever having an opening therethrough to receive the bolt and a plate arranged opposite the lock and at a distance therefrom equal to the thickness of the lever.

2. In combination, a lever, a lever guide, a lock casing, secured to the guide so as to have its face flush with the side of the guide, a spring actuated bolt mounted in said casing and arranged to move transversely of the plane of movement of the lever, said lever having an opening therethrough to receive the bolt and a plate arranged opposite the lock and at a distance therefrom equal to the thickness of the lever, and a catch extending through the wall of the casing and having on its inner end a hook to hold the bolt retracted and having a push button at its outer end.

3. In combination, a lever, a pair of parallel curved guides between which said lever is permanently mounted, a lock casing mounted on one of the guides with its face flush with the side thereof, a plate mounted on the other guide with its face flush with the side thereof, a locking bolt mounted in said casing, a spring for moving said bolt transversely across the space between the guides and into proximity to the said plate, and said lever having a transverse opening therethrough to receive the bolt.

4. In combination a lever, a curved guide engaging one side of the lever, a lock casing secured to the guide so as have its face flush with the side thereof, a locking bolt mounted in said casing and arranged to be moved through an opening in the lever, and a member mounted so as to engage with the other side of the lever at a point opposite the locking bolt.

In testimony whereof, I sign this specification in the presence of two witnesses.

JOHN F. COLTMAN.

Witnesses:
 GEO. L. WILKINSON,
 HARRY S. GAITHER.